United States Patent
Ichikawa et al.

(10) Patent No.: US 7,271,544 B2
(45) Date of Patent: Sep. 18, 2007

(54) LIGHTING APPARATUS FOR ILLUMINATION LIGHT SOURCE

(75) Inventors: Tomoyuki Ichikawa, Shizuoka (JP); Tomokazu Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 97 days.

(21) Appl. No.: 11/197,321

(22) Filed: Aug. 5, 2005

(65) Prior Publication Data
US 2006/0028148 A1 Feb. 9, 2006

(30) Foreign Application Priority Data
Aug. 5, 2004 (JP) ............... P. 2004-229376

(51) Int. Cl.
*H05B 37/02* (2006.01)
(52) U.S. Cl. ............... 315/209 R; 315/291; 315/308
(58) Field of Classification Search ............ 315/209 R, 315/291, 307, 308, 246, 276, 283, 362; 363/21.12
See application file for complete search history.

(56) References Cited

U.S. PATENT DOCUMENTS

| | | | |
|---|---|---|---|
| 4,611,150 A | 9/1986 | Ball et al. | ............. 315/307 |
| 6,163,115 A * | 12/2000 | Ishizuka | ............. 315/308 |
| 6,198,638 B1 * | 3/2001 | Lee | ............. 363/21.14 |
| 6,826,063 B2 * | 11/2004 | Ichikawa et al. | ............. 363/41 |
| 6,989,638 B2 * | 1/2006 | Namba et al. | ............. 315/291 |
| 7,075,806 B2 * | 7/2006 | Ichikawa et al. | ............. 363/97 |
| 2004/0207532 A1 | 10/2004 | Smithson | ............. 340/643 |

FOREIGN PATENT DOCUMENTS

| | | |
|---|---|---|
| DE | 199 15 795 A1 | 10/2000 |
| DE | 103 10 360 A1 | 10/2003 |
| JP | 2002-216986 A | 8/2002 |
| JP | 2003-259641 A | 9/2003 |
| JP | 2003-264095 A | 9/2003 |

* cited by examiner

*Primary Examiner*—Thuy Vinh Tran
(74) *Attorney, Agent, or Firm*—Sughrue Mion, PLLC

(57) ABSTRACT

In a lighting apparatus for an illumination light source (discharge lamp or the like), a fly-back type DC-DC converter circuit comprises a transformer and a switching element. A control circuit is provided for controlling power supplied to the illumination light source, such that operation is controlled in a current boundary mode by a control signal sent from the control circuit to the switching element. A fluctuation generator circuit is provided for giving fluctuations to a frequency at which the switching element is driven by changing the power supplied to the illumination light source with reference to a target power value associated with the power control for the illumination light source.

8 Claims, 4 Drawing Sheets

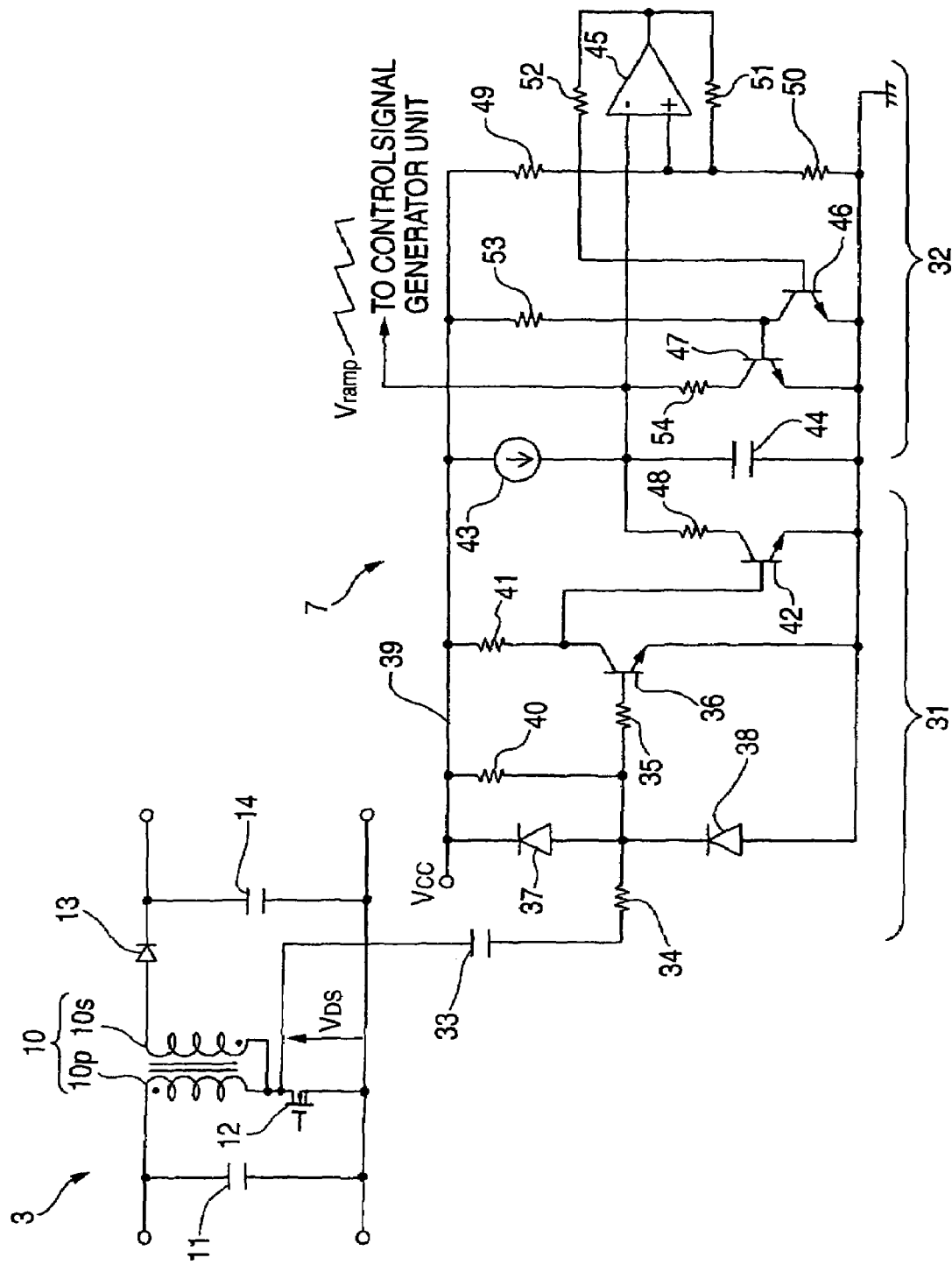

LIGHTING APPARATUS FOR ILLUMINATION LIGHT SOURCE

The present invention claims foreign priority, based on Japanese patent application no. JP2004-229376, filed on Aug. 5, 2004, the contents of which is incorporated herein by reference in its entirety. This priority claim is being made concurrently with the filing of this application.

BACKGROUND

1. Technical Field

The present invention relates to noise prevention techniques in a lighting apparatus which uses a fly-back type DC voltage converting means.

2. Related Art

When a discharge lamp (HID lamp or the like) or a light emitting element (LED or the like) is used for car illumination, a related art switching power supply circuit (DC-DC converter) is employed for controlling the power of the light source. For example, in a related art fly back scheme which employs a transformer, a semiconductor switching element such as an FET arranged on the primary side of the transformer, there are three operation modes as shown below:

Current Continuous Mode;
Current Boundary Mode; and
Current Discontinuous Mode.

In the current continuous mode, a switching element transits to the on position before energy accumulated in a transformer is completely released to the secondary side. On the other hand, in the current boundary mode, a switching element turns on at the time energy accumulated in a transformer has been completely released to the secondary side. In the current discontinuous mode, a switching element turns on after the lapse of a certain period (discontinuous period) from the time energy accumulated in a transformer is completely delivered to the secondary side.

For operating a switching element at high frequencies, the current boundary mode is advantageous in terms of circuit efficiency, because of a reduction in reverse recovery loss of a rectifier diode on the secondary side. However, when constant power is applied to a discharge lamp, the switching frequency is uniquely determined, and the harmonics of the switching frequency exert a problematic influence (radio noise) on a radio broadcasting band.

Thus, a related art method is employed for intentionally generating fluctuations in frequency to disperse the frequency spectrum so as to reduce a temporal average value of the noise.

In a configuration which generates fluctuations to change a switching frequency in the control of an output current or power associated with a discharge lamp (see, for example, Japanese patent publication JP-A-2003-264095), for example, a related atr method changes a reference voltage of an error amplifier, which forms part of a control circuit, by a predetermined frequency, or changes an output voltage of the error amplifier by a predetermined frequency.

However, in the related art circuit configurations, problems arise in terms of the difficulties of accurately setting a fluctuation width for target power in design. Further, in a more complicated configuration, there is an increase in cost and the like associated with the setting.

The radio broadcasting band is divided into the LW band, AM band, SW band, FM band, and the like. For example, to rely on a high frequency switching technique to accomplish a reduction in a parameter such as the size of a circuit device in car illumination applications, the frequency must be set in a band located between the LW band and AM band (approximately 300 to 500 KHz). In this event, unless the fluctuation width is not appropriately set, the noise level cannot be sufficiently reduced, thus requiring countermeasures through additional provision of a noise filter, leading to an increase in the number of parts and the cost.

SUMMARY

It is an object of the invention to provide a lighting apparatus including a fly-back type DC/DC converter circuit, wherein fluctuations can be appropriately given to a switching frequency to sufficiently suppress harmonic noise. However, the present invention may also have other object in addition to or in lieu of the above object, or alternatively, no objects at all, without departing from the scope of the invention.

The invention provides a lighting apparatus for an illumination light source which includes a fly-back type DC-DC converter circuit having a transformer and a switching element for converting an input DC voltage to a desired DC voltage, and a control circuit for controlling the power supplied to the illumination light source, wherein an operation in a current boundary mode is controlled by a control signal sent from the control circuit to the switching element. The light apparatus comprises a fluctuation generator circuit for giving fluctuations to a frequency at which the switching element is driven by changing the power supplied to the illumination light source with reference to a target power value associated with the power control for the illumination light source.

Therefore, fluctuations can be given to the switching frequency, and the width of the fluctuations can be accurately set in design as a result by manipulating the supplied power value on the assumption that fluctuations are allowed upward and downward, centered at a target power value associated with the power control for the illumination light source.

Additionally, the invention relates to an apparatus for a light source, including a converter circuit having a transformer and a switching element, that converts an input voltage to a desired voltage, and a control circuit that controls power supplied to the light source by outputting a control signal to the switching element during a current boundary mode of the converter circuit. The control circuit includes a current boundary control unit that controls operation of the converter circuit in the current boundary mode, and a power control unit that controls power applied to the light source based on a state detection signal.

According to the invention, it is possible to appropriately give fluctuations to the switching frequency to sufficiently suppress harmonic noise, thus substantially preventing electromagnetic interference.

The control circuit comprises an error processing unit, and a control signal generator for generating a control signal to the switching element. The error processing unit is supplied with a reference signal as one input signal, and with an output signal of the fluctuation generator circuit multiplexed on a power control signal calculated based on information on a detected voltage or current of the illumination light source as another input signal. In this way, it is possible to take measures to noise without more complicated circuit configuration and control, and/or a significant increase in cost.

In comparison with a method of multiplexing an output signal of a fluctuation generator circuit on a reference signal of an error processing unit, it is possible to control frequency fluctuations with stability against various factors associated with the manufacturing of the error processing unit, variations in characteristics, changes in temperature, and the like.

BRIEF DESCRIPTION OF THE DRAWINGS

FIG. 4 illustrates an exemplary, non-limiting circuit configuration of a current boundary mode control unit according to the invention.

DETAILED DESCRIPTION

Figure 1:
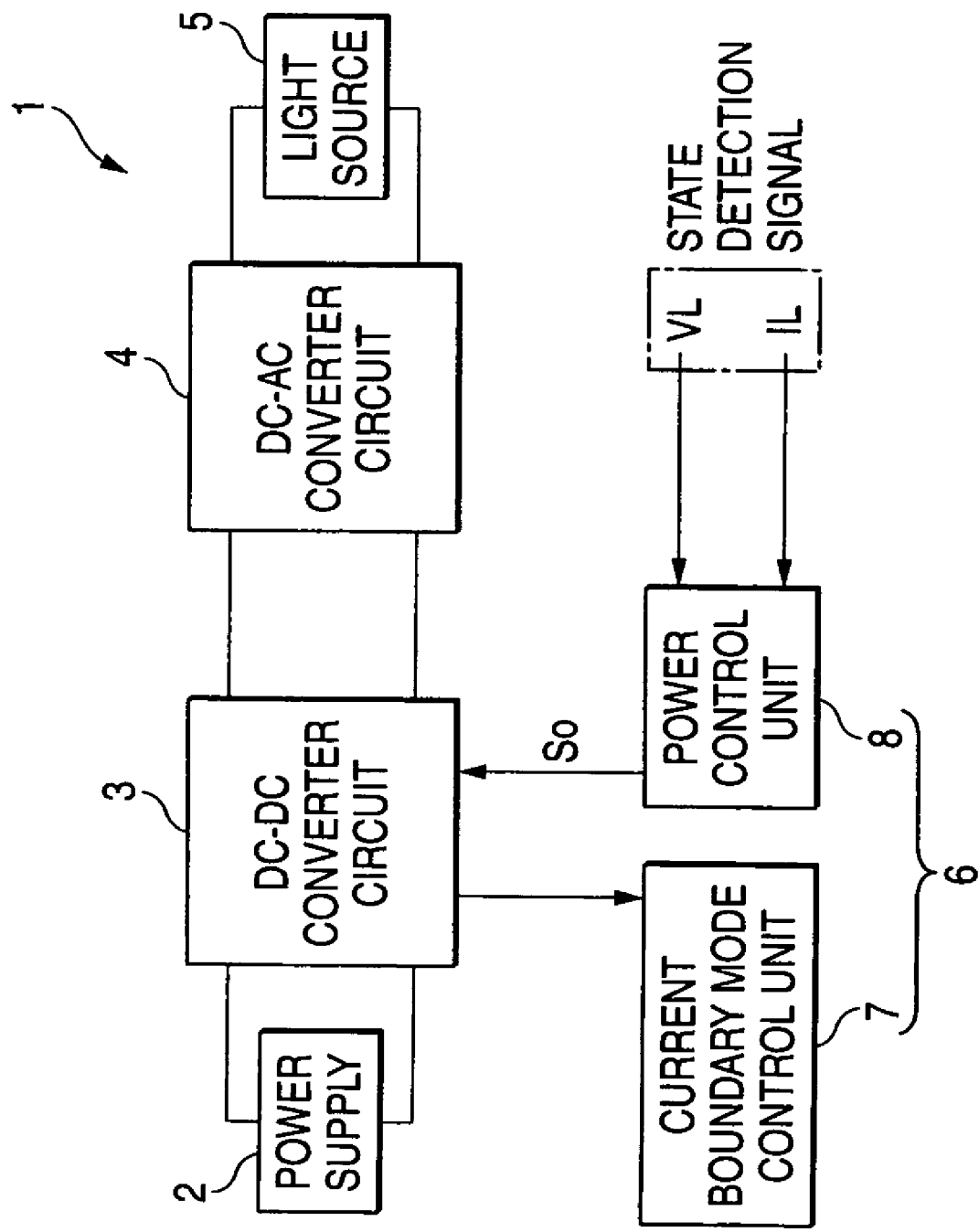
FIG. 1 illustrates an exemplary, non-limiting configuration according to the invention.

FIG. 1 illustrates an exemplary, non-limiting configuration of a discharge lamp lighting apparatus 1. A DC-DC converter circuit 3 coupled to a DC power supply 2 receives a DC input voltage from the DC power supply 2 for conversion to a desired DC voltage. A fly-back type DC-DC converter is used for the DC-DC converter circuit 3. As described further below, in a circuit configuration having a transformer and a switching element, the switching element is driven by a control signal from a control circuit.

A DC-AC converter circuit 4 is provided for converting an output voltage of the DC-DC converter circuit 3 to an AC voltage and supplying the converted AC voltage to an illumination light source 5 (discharge lamp such as an HID lamp). For example but not by way of limitation, in a circuit configuration of H-bridge (or full bridge), four semiconductor switches are used to make up two arms, and driving circuits are included for driving the switching elements on the respective arms substantially independently of each other. The AC voltage is outputted by complementarily controlling two pairs of switching elements to transit on/off.

When a discharge lamp such as a metal halide lamp is used for the illumination light source 5, a circuit (not shown) is provided for generating a high voltage pulse signal (starting pulse) to start the discharge lamp. This high-voltage pulse signal is multiplexed on the AC voltage outputted by the DC-AC converter circuit 4 and applied to the discharge lamp. The DC-AC converter circuit 4 is regarded as an arbitrary component (when the illumination light source 5 is driven by DC as is the case with LED and the like, the DC-AC converter circuit 4 is not required).

A control circuit 6, which is provided for controlling the power supplied to the illumination light source 5, comprises a current boundary mode control unit 7 and a power control unit 8.

The current boundary mode control unit 7 controls the operation of the DC-DC converter circuit 3 in the current boundary mode. The power control unit 8 in turn controls the power applied to the illumination light source 5 in accordance with a state detection signal associated with the illumination light source 5. For example but not by way of limitation, a circuit acquires a detection signal indicative of a lamp voltage and a lamp current or a voltage and a current corresponding thereto. The power control unit 8 receives the lamp state detection signal (a voltage detection signal "VL" and a current detection signal "IL"), and transmits a control signal (labeled "So") to the DC-DC converter circuit 3 to control the output voltage of the DC-DC converter circuit 3.

For generating the signal So, the power control unit 8 references an output signal of the current boundary mode control unit 7. The generated signal So is sent to a switching element which forms part of the DC-DC converter circuit 3, such that the operation of the DC-DC converter circuit 3 is controlled in the current boundary mode in accordance with on/off control of the switching element. Known switching control schemes include, for example but not by way of limitation, a PWM (pulse width modulation) scheme, and PFM (pulse frequency modulation) scheme.

Figure 2:
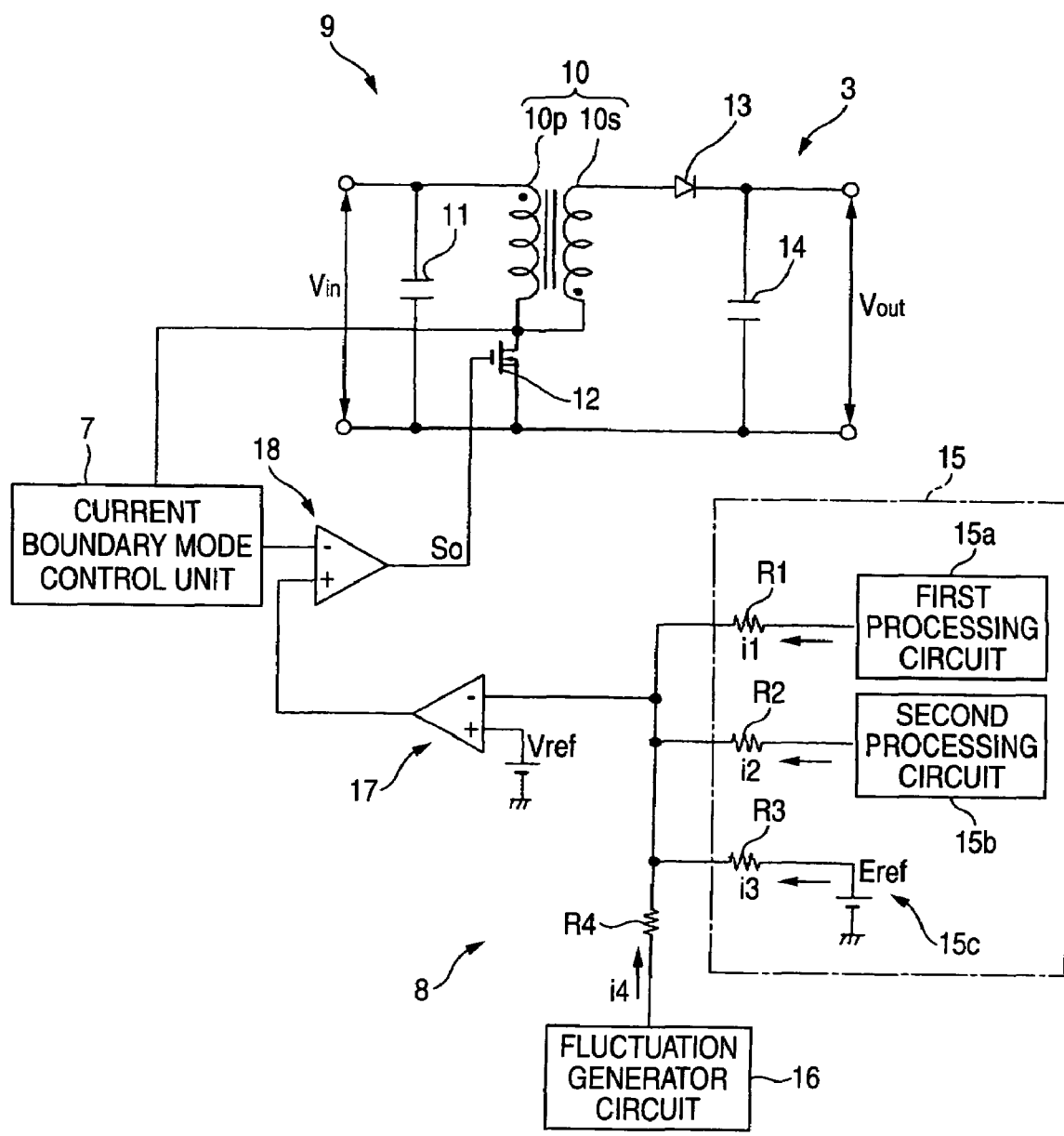
FIG. 2 illustrates an exemplary, non-limiting circuit configuration of a main portion according to the invention.

FIG. 2 is a diagram for explaining an exemplary circuit configuration 9 of a portion including the DC-DC converter circuit 3, current boundary mode control unit 7, and power control unit 8.

"Vin" shown in FIG. 2 indicates a DC input voltage to the DC-DC converter circuit 3, while "Vout" indicates a DC output voltage of the DC-DC converter circuit 3.

A capacitor 11 is disposed on the primary side of a transformer 10. A leading end of a primary winding 10p is connected to one end of the capacitor 11, while a trailing end of the primary winding 10p is connected to a switching element 12. In this example, an N-channel FET is used for the switching element 12. However, the present invention is not limited thereto, and any suitable switching element as would be understood by one of ordinary skill in the art may be used.

A rectifying diode 13 and a smoothing capacitor 14 are disposed on the secondary side of the transformer 10. The leading end of a secondary winding 10s is connected to a connection point of the primary winding 10p with the switching element 12, and the trailing end of the secondary winding 10s is connected to an anode of the diode 13. Then, one end of the capacitor 14 is connected to a cathode of the diode 13, and its terminal voltage is outputted to a load (illumination light source) as Vout.

The current boundary mode control unit 7 has an input terminal connected to a connection of the primary winding 10p with the switching element 12, and a drain-source voltage of the FET is detected in this exemplary, non-limiting embodiment. Then, the current boundary mode control unit 7 transmits its output signal (ramp wave) to a signal generator circuit.

The control circuit 8 comprises a power processing unit 15, a fluctuation generator circuit 16, an error processing unit 17, and a control signal generator unit 18.

The power processing unit 15 comprises a first processor 15a, a second processor 15b, and an offsetting circuit 15c.

The first processor 15a generates an output current (labeled "i1") in accordance with the voltage detection signal VL, and comprises a function generator circuit that receives VL (the type of function may be arbitrary). The output of the first processor 15a is sent to the error processing unit 17 through a resistor R1.

The second processor 15b generates an output current (labeled "i2") in accordance with the current detection signal IL, and comprises a function generator circuit which receives IL (the type of function may be arbitrary). The output of the second processor 15b is sent to the error processing unit 17 through a resistor R2.

As represented by the symbol of a regulated voltage source in FIG. 2, the offsetting circuit 15c sends a reference voltage "Eref" to the error processing unit 17 through a resistor R3 (see an output current "i3").

The fluctuation generator circuit 16 is provided for varying the power supplied to the illumination light source 5 with reference to a target power value based on the aforementioned i1, i2, i3 to provide fluctuations to the driving frequency of the switching element 12. The output of the fluctuation generator circuit 16 is sent to the error processing unit 17 through a resistor R4 (an output current "i4").

The first processing unit 15a, second processing unit 15b, offsetting circuit 15c, and fluctuation generator circuit 16 are arranged in parallel, and weighted additions are performed in accordance with weighting coefficients determined by the respective resistances of the resistors R1-R4, to send control signals of the respective components (the sum total of respective output currents) to the error processing unit 17. In this example, the control signal is inputted to a negative input terminal of an error amplifier that forms part of the error processing unit 17, and a positive input terminal of the error amplifier is supplied with the reference voltage "Vref" represented by the symbol of the regulated voltage source.

An output signal of the error processing unit 17 is sent to the subsequent control signal generator 18 which generates the control signal So. For example but not by way of limitation, in the PWM scheme, the control signal generator 18 includes a PWM comparator, and an error signal from the error processing unit 17 is supplied to a positive input terminal of the comparator. The PWM comparator is supplied with the output signal of the current boundary mode control unit 7 at its negative input terminal, and the PWM comparator generates an output signal having a duty ratio that varies in accordance with the result of a comparison between the two signals. The output signal is supplied to the switching element 12.

In the PFM scheme, an output signal, the frequency of which varies in accordance with an error signal from the error processing unit 17, is generated and supplied to the switching element 12.

Figure 3:
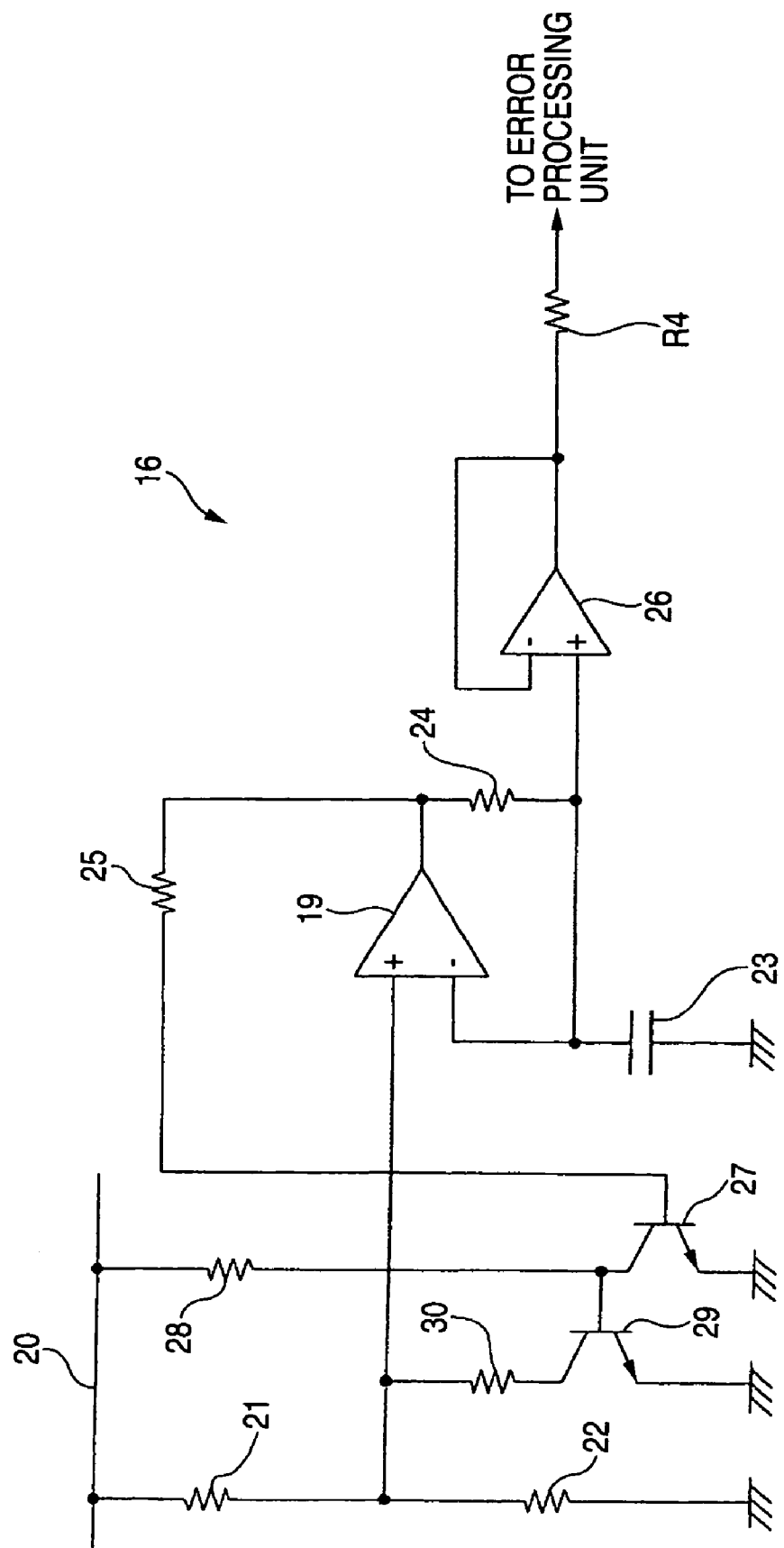
FIG. 3 illustrates an exemplary, non-limiting configuration of a fluctuation generator circuit according to the invention.

FIG. 3 illustrates an exemplary configuration of the fluctuation generator circuit 16. An operational amplifier 19 receives at a non-inverting input terminal a power supply voltage (Vcc) from a power supply line 20, or a voltage generated by dividing a reference voltage by series resistors 21, 22. The operational amplifier 19 has an inverting input terminal grounded through a capacitor 23.

Resistors 24, 25 are coupled to an output terminal of the operational amplifier 19. The output terminal is connected to a non-inverting input terminal of a subsequent operational amplifier 26 and to a capacitor 23 through the resistor 24. The operational amplifier 26 forms part of a voltage buffer, with its inverted input terminal coupled to its output terminal and to the resistor R4.

The resistor 25, on the other hand, is connected to a base of an emitter-grounded NPN transistor 27. The transistor 27 has a collector connected to the power supply line 20 through a resistor 28, and also connected to a base of an emitter-grounded NPN transistor 29.

Then, the NPN transistor 29 has a collector coupled to the non-inverting input terminal of the operational amplifier 19 through a resistor 30.

A hysteresis comparator includes the operational amplifier 19 and transistors 27, 29, and an oscillator is formed by adding a feedback resistor 24 and a capacitor 23 to the hysteresis comparator. When an upper limit threshold and a lower limit threshold associated with the hysteresis comparator are labeled "V+" and "V−," respectively, a terminal voltage across the capacitor 23 appears as a fluctuating wave which substantially continuously varies between V+ and V− at a frequency (for example, several tens to 100 Hertz). Then, this signal is supplied from the resistor R4 to the error processing unit 17 through a voltage buffer.

As illustrated in FIG. 2, the fluctuating wave is multiplexed on the output current of the power processing unit 15 in accordance with the resistance of the resistor R4 to vary the target supply power. In other words, the fluctuating width can be changed by setting or adjusting the resistance. For example, but not by way of limitation, a smaller resistance of the resistor R4 causes the fluctuating wave to exert more influence, and occupy a larger proportion in the power calculation result.

FIG. 4 illustrates an exemplary, non-limiting circuit configuration of the current boundary mode control unit 7, which comprises a current boundary detector circuit 31 and a ramp wave generator circuit 32.

"$V_{DS}$" in FIG. 4 indicates a drain-source voltage of the FET used for the switching element 12, and is supplied to a base of an NPN transistor 36 through a capacitor 33 and a resistor 34 coupled in series in the current boundary detector circuit 31.

Two diodes 37, 38 make up a limiter circuit, where the diode 37 has a cathode connected to a power supply line 39 at a voltage, and an anode coupled to a connection of the resistor 34 with the resistor 35. The diode 38 has a cathode connected to the anode of the diode 37, and an anode grounded.

The emitter-grounded NPN transistor 36 has its base coupled to the power supply line 39 through the resistors 35, 40. The transistor 36 has a collector coupled to the power supply line 39 through a resistor 41 and coupled to a base of a subsequent NPN transistor 42.

A ramp wave generator circuit 32 includes a regulated current source 43, a capacitor 44, an operational amplifier 45, and transistors 46, 47.

The capacitor 44 has one end coupled to a collector of the transistor 42 through a resistor 48, and is coupled to the regulated current source 43. When the transistor 42 is off, the capacitor 44 is charged by the regulated current source 43.

The operational amplifier 45 is supplied with a terminal voltage across the capacitor 44 at its inverting input terminal, and a reference voltage divided by resistors 49, 50 at its non-inverting input terminal. A resistor 51 is a feedback resistor connected to the non-inverting input terminal and output terminal of the operational amplifier 45.

The emitter-grounded transistor 46 has a base coupled to the output terminal of the operational amplifier 45 through a resistor 52, and a collector coupled to the power supply line 39 through a resistor 53.

Then, the subsequent transistor 47 has abase coupled to the collector of the transistor 46, and a collector coupled to the non-inverting input terminal of the operational amplifier 45 through a resistor 54.

In the foregoing configuration, the edge of $V_{DS}$ associated with the switching transistor 12 is detected using the capacitor 33, and the transistors 36, 42 are controlled to turn on or off in response to the result of the detection. Specifically, $V_{DS}$ starts resonating at the time a discharged secondary current is stopped from the transformer 10. As its negative-transitioning edge is detected, the transistor 36 temporarily is transited to the off position, causing the transistor 42 to transit to the on position.

A hysteresis comparator comprises the operational amplifier 45 and transistors 46, 47, and an oscillator is formed by adding the feedback resistor 51 and capacitor 44 to the hysteresis comparator. A ramp wave "Vramp" extracted from the capacitor 44 is sent to the control signal generator 18. When the transistor 42 temporarily transits on upon detection of the edge, the capacitor 44 is discharged to decrease the level of Vramp. Subsequently, from the time the transistor 42 transits off, the level of Vramp increases. The foregoing operations are repeated.

As a result of comparing the level of Vramp generated by the current boundary mode control unit 7 with the level of the output signal of the error processing unit 17, the control signal So is generated to control the driving of the switching element 12, thereby permitting the DC-DC converter circuit 3 to implement the operation in the current boundary mode.

Specifically, the following cycle is accomplished. The transformer 10 stores the energy while the switching element 12 is on, whereas the energy is outputted from the secondary winding 10s while the switching element 12 is off. Then, from the time the energy has been completely emitted, the switching element 12 again transits on.

A time period for which the primary current flows in the transformer 10 is correlated to the output power, so that a change in the output voltage results in a change in the time period for which the primary current flows, resulting in fluctuations in the switching frequency. In other words, a relationship is established in that the switching frequency becomes lower (higher) as the output power increases (decreases) with reference to its target value or average value.

For changing the output power, in the configuration of FIG. 2, the error processing unit 17 is applied, as one input signal thereof, with the output signal (i4) of the fluctuation generator circuit 16 multiplexed on the power control signal (i1 to i3) calculated based on information on the detected voltage or current associated with the illumination light source. In other words, when the fluctuation waveform increases (decreases) in voltage, the target power value supplied to the illumination light source is increased (reduced), thereby extending (reducing) a time period for which the primary current flows in the transformer 10, with the result that the switching element is driven at a lower (higher) frequency.

According to the configuration described above, in controlling the power to the illumination light source, fluctuations can be given to the switching frequency as a result by changing the supplied power with reference to its target power value (for example but not byway of limitation, the amount of change should be approximately 5% to 30% of the rated power value, such that a change in light amount is not visually recognized). It is possible to take measures to noise with a relatively simple circuit configuration without adding a noise filter or the like.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The invention claimed is:

1. An apparatus for an illumination light source which includes a fly-back type DC-DC converter circuit having a transformer and a switching element that converts an input DC voltage to a desired DC voltage, and a control circuit that controls power supplied to the illumination light source, wherein an operation in a current boundary mode is controlled by a control signal transmitted from the control circuit to the switching element, said apparatus comprising:
a fluctuation generator circuit that generates fluctuations at a frequency at which the switching element is driven by changing the power supplied to the illumination light source with reference to a target power value associated with the power control for the illumination light source.

2. The apparatus according to claim 1, wherein the control circuit comprises an error processing unit, and a control signal generator that generates a control signal to the switching element, wherein the error processing unit is supplied with a reference signal as one input signal, and with an output signal of the fluctuation generator circuit multiplexed on a power control signal calculated based on information on a detected voltage or a detected current of the illumination light source as another input signal.

3. An apparatus for a light source, comprising:
a converter circuit having a transformer and a switching element, that converts an input voltage to a desired voltage; and
a control circuit that controls power supplied to the light source by outputting a control signal to said switching element during a current boundary mode of said converter circuit, said control circuit comprising,
a current boundary control unit that controls operation of said converter circuit in said current boundary mode;
a power control unit that controls power applied to said light source based on a state detection signal; and
a fluctuation generator circuit that generates a second current signal that is multiplexed with at least one first current signal to generate a power control signal.

4. The apparatus according to claim 3, the control circuit further comprising:
a power processing unit that generates the at least one first current signal based on a state detection signal comprising at least one of a voltage detection signal and a current detection signal of said light source, and an error reference signal;
an error processing unit, supplied with a reference signal as a first input signal and said power control signal as a second input signal, that generates an error processing output unit signal;
a boundary detector circuit that receives a drain and source voltage signal from said switching element to detect said current boundary mode; and
a ramp wave generator circuit that generates a ramp voltage based on said detected current boundary mode and a current source; and
a control signal generator that generates said control signal to the switching element based on said ramp voltage and said error processing unit output signal.

5. The apparatus according to claim 4, wherein said power processing unit comprises a first power processor that generates a first power processor output based on said voltage detection signal, a second power processor that generates a second power processor output based on said current detection signal, and an offset circuit that generates said error reference signal, wherein said first power processor output, said second power processor output and said error reference signal comprise said at least one first current signal, and are multiplexed with said second current signal of said fluctuation generator.

6. The apparatus according to claim 5, wherein each of said first power processor, said second power processor, said offset circuit and said fluctuation generator circuit are weighted by respective resistive elements.

7. The apparatus according to claim 4, wherein said fluctuation generator comprises a voltage divider that receives a power supply and generates a divided voltage, an oscillator having a hysteresis comparator coupled to a resistive element that generates an oscillating output based on said divided voltage, and a voltage buffer that receives said oscillating output and generates said second current signal of said fluctuation generator circuit.

8. The apparatus according to claim 4, wherein said control signal generator generates said control signal based on one of pulse width modulation and pulse frequency modulation.

* * * * *